United States Patent
McDonnell et al.

(10) Patent No.: US 9,353,853 B2
(45) Date of Patent: May 31, 2016

(54) CONTROL OF TRANSMISSION LATCH VALVE

(71) Applicant: Ford Global Technologies, LLC, Dearborn, MI (US)

(72) Inventors: Alexander Phillip McDonnell, Dexter, MI (US); Kendrick Morrison, Wayne, MI (US); Cory LaRoche, Wixom, MI (US); Derek Kinch, Ypsilanti, MI (US); John Armstead, Royal Oak, MI (US); Brian Michael O'Neil, Ann Arbor, MI (US); Pramod Kumar Jain, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/503,726

(22) Filed: Oct. 1, 2014

(65) Prior Publication Data

US 2016/0097448 A1    Apr. 7, 2016

(51) Int. Cl.
| | |
|---|---|
| G06F 17/00 | (2006.01) |
| F16H 61/00 | (2006.01) |
| F16D 48/02 | (2006.01) |
| F16D 25/0638 | (2006.01) |
| F16K 31/12 | (2006.01) |

(52) U.S. Cl.
CPC ........ F16H 61/0021 (2013.01); F16D 25/0638 (2013.01); F16D 25/14 (2013.01); F16K 31/12 (2013.01)

(58) Field of Classification Search
None
See application file for complete search history.

(56) References Cited

U.S. PATENT DOCUMENTS

| | | | |
|---|---|---|---|
| 5,697,865 A | 12/1997 | Jang | |
| 5,778,330 A * | 7/1998 | McKee | F16H 61/12 180/273 |
| 6,478,707 B1 | 11/2002 | Jang | |
| 6,537,180 B2 | 3/2003 | Kim et al. | |
| 7,402,124 B2 * | 7/2008 | Stevenson | F16D 48/0206 477/158 |
| 7,935,025 B1 * | 5/2011 | Lee | B60W 10/06 477/115 |
| 8,771,121 B2 * | 7/2014 | Otanez | F16D 25/14 251/32 |
| 8,894,545 B2 * | 11/2014 | Berger | F16H 59/08 475/130 |
| 8,960,232 B2 * | 2/2015 | Burkhart | F15B 13/0402 137/625.64 |
| 9,249,844 B2 * | 2/2016 | Ross | F16D 25/14 |
| 2007/0066435 A1 | 3/2007 | Takagi et al. | |
| 2007/0281816 A1 | 12/2007 | Long et al. | |
| 2010/0313970 A1 | 12/2010 | Mahapatro et al. | |
| 2013/0026401 A1 | 1/2013 | Burkhart et al. | |
| 2013/0056657 A1 | 3/2013 | Burkhart et al. | |

* cited by examiner

*Primary Examiner* — Dirk Wright

(74) *Attorney, Agent, or Firm* — James Dottavio; Brooks Kushman P.C.

(57) ABSTRACT

A transmission includes a latch valve with latched and de-latched states. In the de-latched state, the latch valve directs a control pressure to a clutch apply circuit. In the latched state, which is entered in response to a control pressure higher than a latch pressure, the latch valve directs a line pressure to the clutch apply circuit. A controller manages the transition from latched to de-latched differently depending upon the transmission input torque and gear state. At high transmission input torque, the controller first reduces the control pressure to rapidly accelerate a spool in the latch valve, and then increases the control pressure to prevent clutch slip. At low torque, the controller reduced the pressure to an intermediate value during the transition and then reduces it again. At moderate torques, the controller reduces the pressure directly to a target pressure in a single step.

17 Claims, 8 Drawing Sheets

CONTROL OF TRANSMISSION LATCH VALVE

TECHNICAL FIELD

This disclosure relates to the field of automatic transmission controls. More particularly, the disclosure pertains to control of a latch valve during a de-latch operation.

BACKGROUND

An automatic transmission establishes various power flow paths having different speed ratios by selectively engaging and disengaging a number of shift elements. The shift elements include friction clutches. The torque capacity of each friction clutch is determined based on a signal from a transmission controller. For example, a controller may vary the pressure of hydraulic fluid in a particular passageway, called a circuit. Fluid from the circuit may be routed to a piston apply chamber of a clutch causing the piston to exert a force related to the fluid pressure. The piston force may squeeze friction plates between separator plates to establish a torque capacity of a clutch.

Hydraulic fluid may be supplied to a transmission valve body line pressure circuit by an engine driven pump, an electric pump, an accumulator, or other means. The pressure is often regulated to a line pressure by a regulator valve or by adjusting the displacement of the pump. Various circuits in the valve body are supplied with fluid at controlled pressures less than line pressure using pressure control valves.

Sometimes, a latch valve is interposed between a pressure control valve and a corresponding clutch apply circuit. The latch valve creates a non-linear relationship between clutch apply pressure and the controlled pressure. When the controlled pressure is less than a latch pressure, the latch valve directs flow from the controlled pressure circuit to the clutch apply circuit. This is called the de-latched state. When the controlled pressure exceeds the latch pressure, the latch valve directs flow from the line pressure circuit to the clutch apply circuit. This is called the latched state. The latch valve permits a low clutch gain for more accurate control of clutch apply pressure in the unlatched state while still allowing full line pressure in the latched state.

When the transmission is in a steady speed ratio, the clutch apply circuits for the engaged clutches are each supplied with a high enough pressure that the clutch torque capacity exceeds the torque transmitted by the clutch. This may be accomplished by commanding a pressure high enough to enter the latched state. When the controller determines that a speed ratio change is needed, the controller executes a shift by releasing one shift element called an off-going element and engaging another shift element called an on-coming element. For the shift to feel smooth to vehicle occupants, it is important that the torque capacity of the on-coming element and the torque capacity of the off-going element be coordinated with respect to one another and with respect to the engine torque. For example, if the off-going clutch is released prematurely, then the output torque will drop excessively and the engine speed will rise. This phenomenon is called an engine flare. On the other hand, if the off-going element is released too late, then the two shift elements will resist one another and the output torque will drop excessively. This phenomenon is called a tie-up. To actively control the torque capacity of the off-going element, the latch valve must be in the de-latched state. If the latch valve for the off-going element was previously in the latched state, then a state transition must occur before the controlled can execute the shift.

SUMMARY OF THE DISCLOSURE

A transmission includes a latch valve configured to supply pressurized fluid to a clutch apply chamber based on a signal from a controller. The latch valve includes a bore with an outlet port in fluid communication with the clutch apply chamber, a line pressure port supplied with fluid at line pressure, and a control pressure port supplied with fluid at a pressure commanded by the controller. The outlet port may be between the line pressure port and the control pressure port and separated from them by bore lands. A spool slides within the bore between a latched position and a de-latched position. The spool may have three spool lands such that the line pressure port is between first and second lands and the control pressure port is between second and third lands. The third land may have a larger diameter than the first and second lands such that pressure between the second and third lands bias the spool toward the latched position. The latch valve may also include a return spring biasing the spool toward the de-latched position.

The controller is programmed to command the control pressure during de-latch events in a manner that depends upon the transmission input torque. At a first transmission input torque, which is relatively high, the controller is programmed to reduce the pressure to a value less than a clutch apply pressure required to prevent clutch slip to initiate a first de-latch event and then, while the spool is moving to the de-latched position, to increase the control pressure to a first value to prevent clutch slip. When the transmission input torques is below an upper threshold, the controller may be programmed to reduce the pressure monotonically to a target pressure. At moderate transmission input torques, between a lower threshold and the upper threshold, the controller may reduce the pressure in a single step. At low transmission input torques, below the lower threshold, the controller may reduce the pressure to an intermediate value and then reduce it again to the target value after the spool moves to the de-latched position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
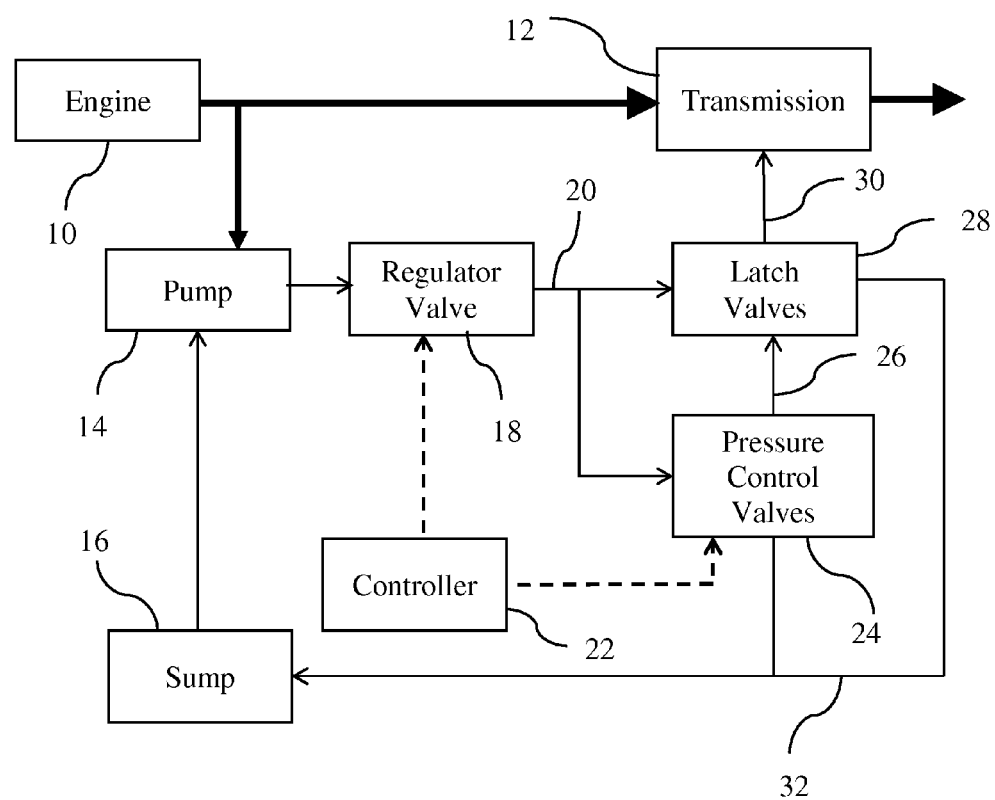
FIG. 1 is a schematic diagram of a transmission hydraulic control system.

FIG. 1 illustrates a hydraulic control system for a transmission. In this Figure, bold lines indicate flow of mechanical power, solid lines indicate flow of hydraulic fluid, and dotted lines indicate flow of signals. Engine provides power to the input of transmission 12. Transmission 12 adapts the speed and torque to the needs of the vehicle and delivers the power to an output shaft. Some of the engine power is diverted to drive pump 14 which draws fluid from a sump 16 and delivers it to the hydraulic control system. A regulator valve 18 controls the pressure of the fluid from the pump to a line pressure circuit 20. A controller 22 may vary the pressure in the line pressure circuit by sending a control signal to the regulator valve.

The control system includes a number of pressure control valves 24. For example, there may be a pressure control valve for each friction element in transmission 12. Each pressure control valve adjusts the pressure in a corresponding controlled pressure circuit 26 according to a signal from controller 22. Within each pressure control valve, a spool moves within a bore to vary the size of a restriction between the line pressure circuit and the controlled pressure circuit. The controller supplies an electric current with a magnitude proportional to the desired pressure to a solenoid. The solenoid exerts a force proportional to the current on the spool, pushing the spool in a direction that tends to enlarge the restriction. The controlled pressure circuit acts on a spool area pushing the spool in the opposite direction tending to restrain the flow. The spool reaches an equilibrium position at which the forces are balanced and at which the controlled pressure is proportional to the current. The coefficient of proportionality, called the gain, is determined by the solenoid properties and by the design of the pressure control valve.

Some or all of the pressure control valves may be associated with corresponding latch valves 28. In steady state, the latch valve directs fluid from either line pressure circuit 20 or the control pressure circuit 26 to a corresponding clutch apply circuit 30. Specifically, when the control pressure is below a latching value, the latch pressure feeds the control pressure to the clutch apply circuit and, when the control pressure is above the latching value, the latch valve feeds line pressure to the clutch apply circuit. The pressure control valves and latch valves may also utilize an exhaust circuit 32 which drains fluid back to the sump 16 at very low pressure. Other fluid flow routes back to the sump 16 are omitted from FIG. 1 for clarity.

Figure 2:
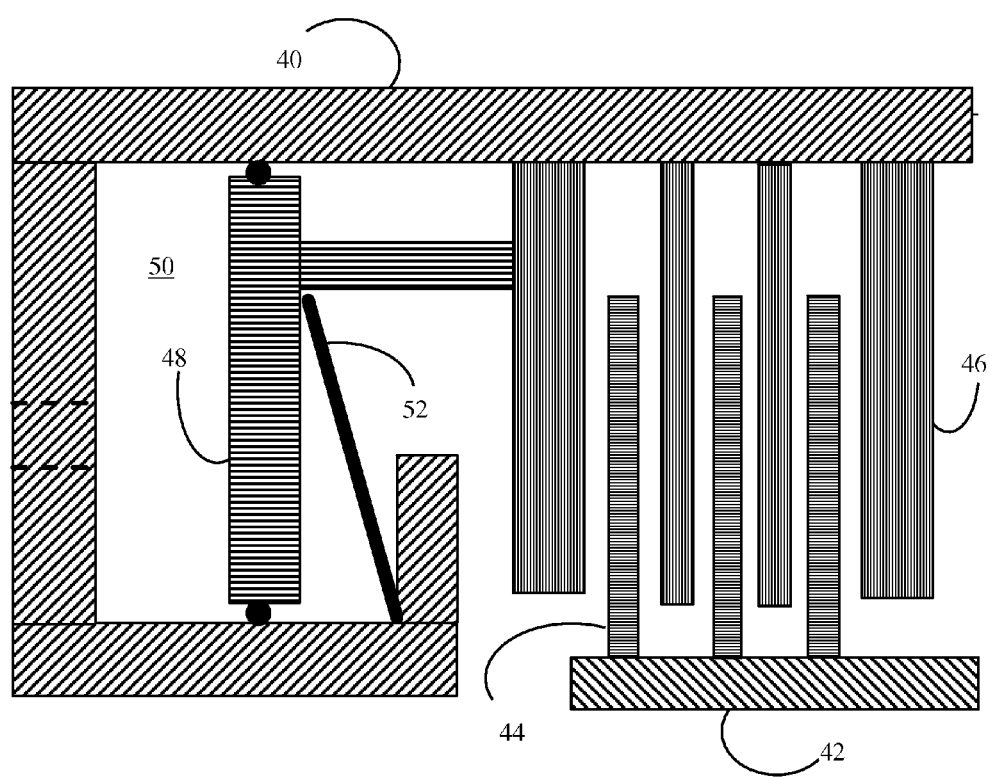
FIG. 2 is a cross section of an exemplary transmission clutch.

FIG. 2 illustrates an exemplary friction clutch or brake that may be utilized within transmission 12. The clutch includes a housing 40 and a hub 42. In the case of a brake, housing 40 may be integrated into the transmission case. Otherwise, housing 40 may be fixed to a rotating transmission component. Hub 42 is typically fixed to a rotating transmission component. A set of friction plates 44 is splined to the hub and interleaved with a set of separator plates 46 splined to the housing. A piston 48 is configured to slide within the housing. When pressurized fluid is routed to apply chamber 50 via clutch apply circuit 30, piston 48 is forced to the right, squeezing the friction plates 44 between the separator plates 46 to transfer torque between the housing 40 and the hub 42. When the fluid pressure is released, return spring 52 forces the piston back.

The torque capacity of the clutch is determined by, among other parameters, the pressure in the clutch apply chamber. When the rotating speed of the hub 42 differs from that of the housing 40, the clutch is in a slipping condition. In a slipping condition, torque equal to the clutch torque capacity is transmitted from the faster component to the slower component. When the speeds are equal, the transmitted torque is proportional to transmission input torque. The ratio of clutch torque to transmission input torque depends upon the gearing arrangement and the selected ratio. If the transmitted torque exceeds the clutch torque capacity, then the clutch transitions to a slipping condition.

Figure 3:
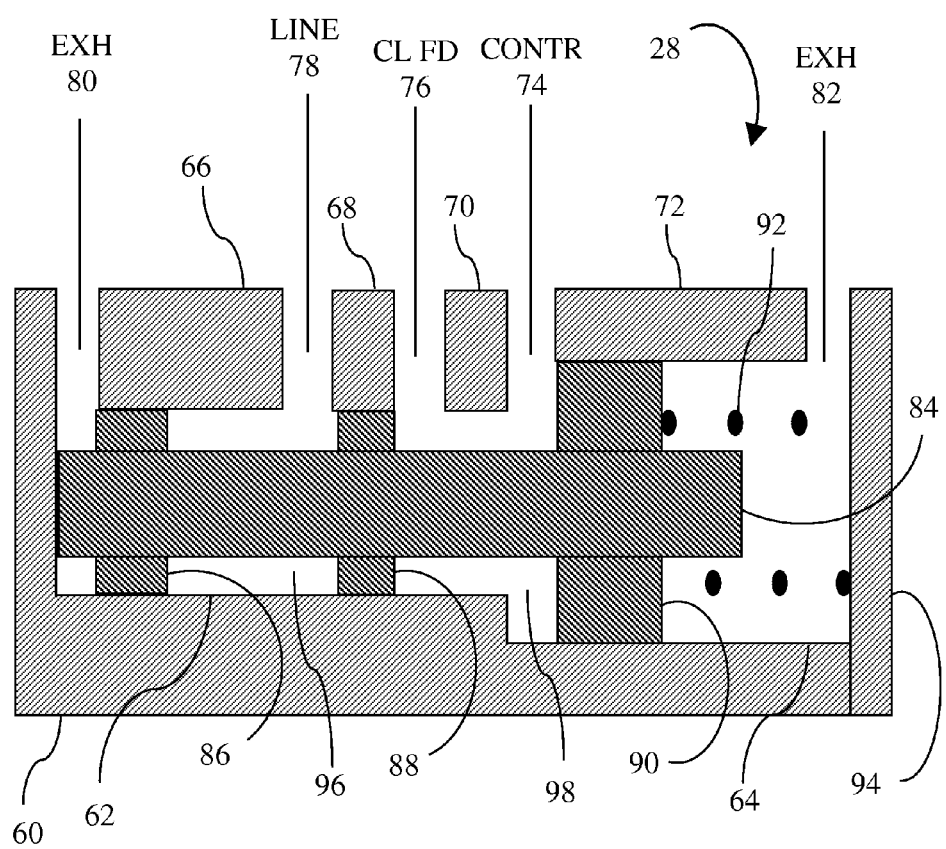
FIG. 3 is a cross section of a latch valve in a de-latched position.

FIG. 3 illustrates a latch valve in a de-latched state. The de-latch valve includes a housing 60 with a first bore 62 and a second bore 64. The two bores are concentric. The second bore 64 has a larger diameter than the first bore 62. A series of housing lands 66, 68, 70, and 72 in housing 60 define a number of openings called ports. A first port 74 is connected to the controlled pressure circuit. A second port 76 is connected to the clutch apply circuit. A third port 78 is connected to the line pressure circuit. Fourth port 80 and fifth port 82 are both connected to unpressurized circuits that exhaust fluid to the transmission case.

A spool includes a central shaft 84 to which first spool land 86, second spool land 88, and third spool land 90 are fixed. The spool may be manufactured in a variety of ways including, but not limited to, machining from a common solid or forming from powdered metal. First spool land 86 and second spool land 88 have diameters approximately equal to the diameter of the first bore 62 such that the spool slides freely within the bore but the spool lands create an effective fluid seal against the bore. Similarly, third spool land 90 has a diameter approximately equal to the diameter of the second bore 64. The spool and spring 92 are inserted into the housing and then cap 94 is fixed to the housing. Spring 92 biases the spool toward the left end of the housing.

A first chamber 96 is formed between the housing 60, first spool land 86, and second spool land 88. In the de-latched state shown in FIG. 3, the first chamber is exposed only to the line pressure circuit through port 78. Because the first and second spool lands have the same area, pressure in the first chamber does not exert any net force on the spool. A second chamber 98 is formed between the housing 60, second spool land 88, and third spool land 90. In the de-latched state shown in FIG. 3, the second chamber is exposed to both the control pressure circuit through port 74 and the clutch apply circuit through port 76. Fluid flows from port 74 to port 76 through chamber 98 with negligible pressure drop. Because the area of the third spool land 90 is larger than the area of the second spool land 88, pressure in the second chamber exerts a force on the spool pushing the spool towards the right. In the de-latched state shown in FIG. 3, this force is less than the force exerted by spring 92 so the spool remains at the left end of the housing. The fluid pressure on both ends of the spool is negligible, so the net fluid force exerted on the ends of the spool is negligible.

Figure 4:
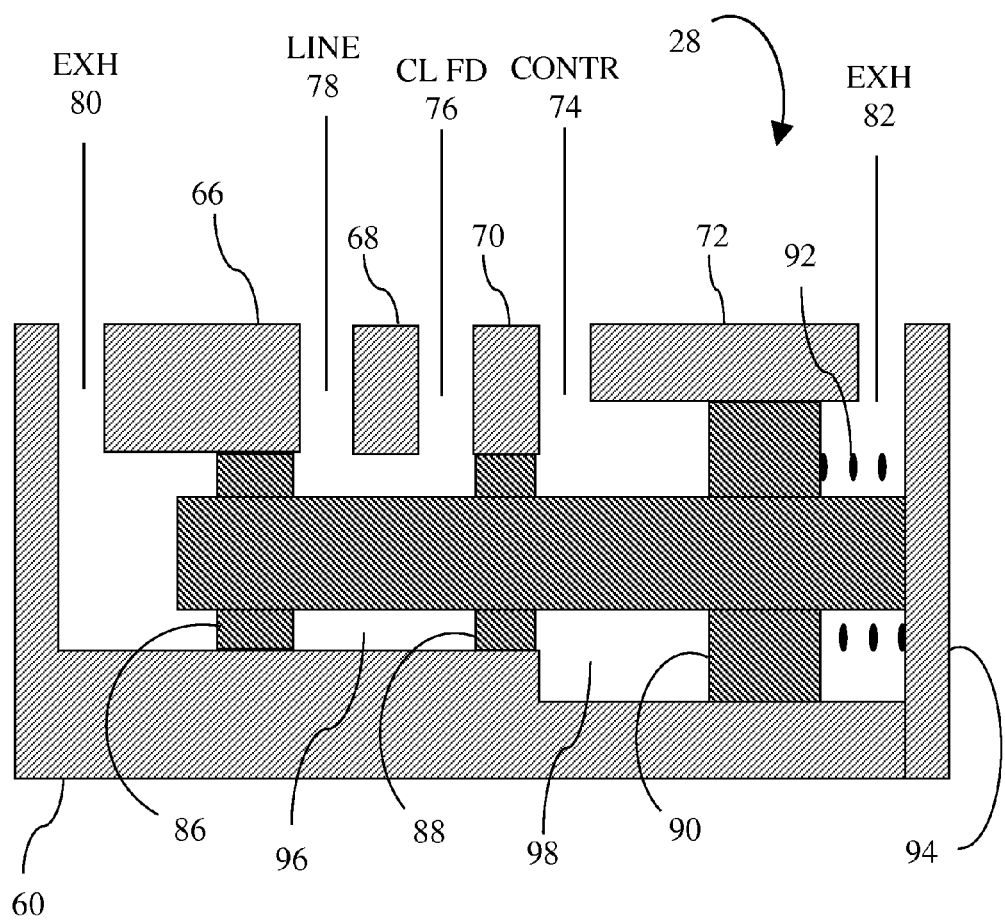
FIG. 4 is a cross section of the latch valve of FIG. 3 in a latched position.

FIG. 4 illustrates the latch valve in the latched state. In the latched state, first chamber 96 is exposed to both the line pressure circuit through port 78 and to the clutch apply circuit through port 76. Fluid flows from port 78 to port 76 through chamber 96 with negligible pressure drop maximizing the torque capacity of the clutch. In the latched state, second chamber 98 is exposed only to the control pressure circuit through port 74. In the latched state, the pressure in chamber 98 is generates a large enough net force to overcome the force exerted by spring 92 and pushing the spool to the right end of the housing.

Figure 5:
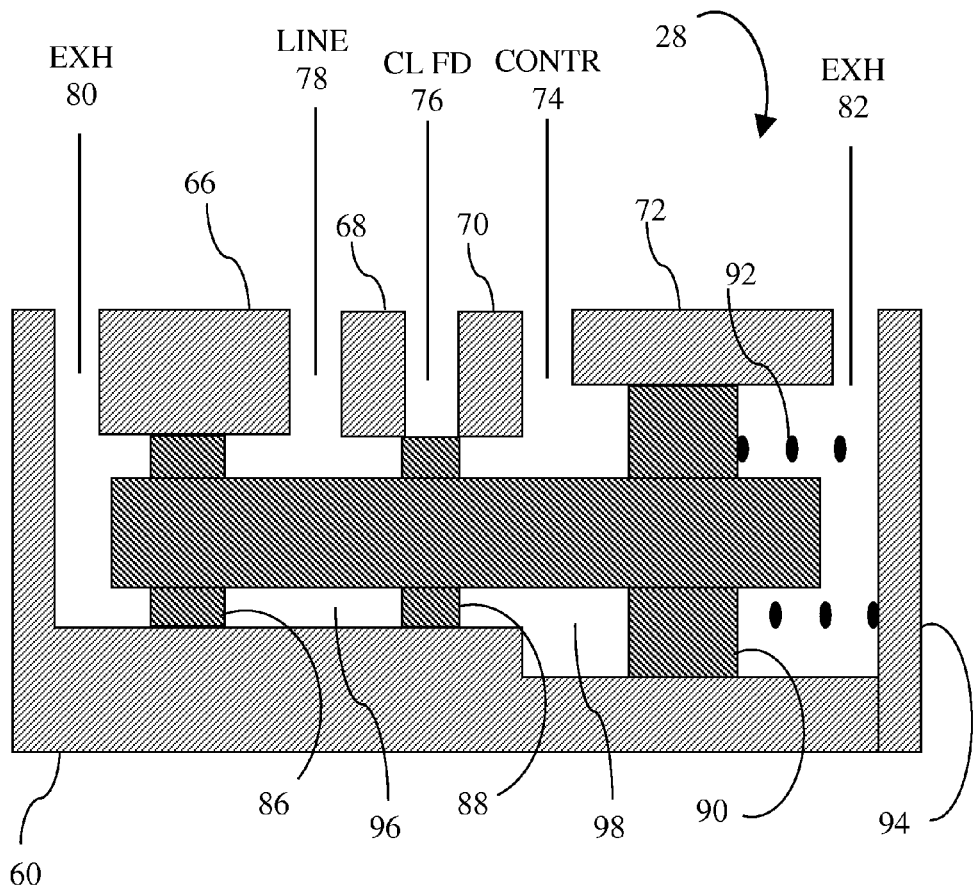
FIG. 5 is a cross section of the latch valve of FIG. 3 in a transitional neutral position.

FIG. 5 illustrates the latch valve in a transitional state between the latched and the de-latched states. In some embodiments, land 88 may be slightly wider than clutch feed port 76 such that clutch feed port is sealed off from both the line pressure circuit and from the controlled pressure circuit. In other embodiments, land 88 may be slightly narrower than clutch feed port 76 such that clutch feed port is open to both the line pressure circuit and the controlled pressure circuit although the passageways would be very small.

The spool moves from the latched position of FIG. 4 to the de-latched position of FIG. 3 whenever the commanded pressure is less than the latch pressure for a sufficiently long period of time. However, if the commanded pressure is only slightly less than the latch pressure, the transition to the de-latched state can take excessively long. The controller cannot begin releasing the off-going clutch until the corresponding latch valve is in the de-latched position. Therefore, the controller must wait to begin executing the shift causing driver dis-satisfaction.

The spool has non-negligible inertia, both due to its own mass and due to the mass of fluid that must move within hydraulic circuits 80 and 82 in order to permit movement of the spool. If the commanded pressure is only slightly less than the latch pressure, then the net force on the spool is small and the spool acceleration toward the de-latched position is small limiting the speed of movement of the spool toward the de-latch position. Furthermore, as soon as clutch feed circuit 76 is exposed to chamber 98, fluid that had been pressurized to line pressure flows into chamber 98 increasing the pressure within chamber 98 and decelerating the spool. If the length of spool land 88 is less than the length of port 76, then there will be a period of time during which fluid flows from line pressure circuit into chamber 98 raising the pressure of chamber 98 above the commanded pressure and decelerating the spool. If, on the other hand, the length of spool land 88 is greater than the length of port 76, then there will be a period of time during which clutch feed circuit is not connected to either the line pressure circuit or the controlled pressure circuit. If there is any leakage in the clutch feed circuit, the pressure in the clutch feed circuit may drop to less than the commanded pressure. If the pressure drops too much, the clutch capacity may decrease such that the clutch begins to slip. Then, the clutch may re-lock just as the controller is ready to start releasing it in a controlled manner. Vehicle occupants may feel the resulting torque disturbance and be annoyed.

To avoid long transitions to the de-latched state, the commanded pressure must be substantially less than the latch pressure such that the spool acceleration is high and the spool moves rapidly past the neutral state. The maximum pressure at which the system must be able to modulate clutch apply pressure is dictated by the maximum torque capacity of the clutch during a shift. The latch valve may be designed with a latch pressure substantially above this value. However, that requires that the pressure control valve be designed to deliver even higher pressures in order to achieve latch. Designing the pressure control valve to achieve higher pressures reduces the accuracy at which it can control the pressure. Alternatively, faster de-latch may be accomplished by briefly commanding a pressure substantially below the target pressure to accelerate the spool and then increasing the commanded pressure to the target pressure just before the spool moves past the neutral position. The spool's inertia carries it rapidly past the neutral position into the de-latched state. With this revised control method, the latch valve may designed with a latch pressure only slightly higher than the maximum pressure at which the system must be able to modulate clutch apply pressure.

Commanding an excessively low pressure during a transition from latched to de-latched may also lead to undesirable behavior. The dynamic behavior of pressure control valve 24 may cause the controlled pressure to temporarily fall below (undershoot) the commanded pressure following a step change reduction in the pressure command. Recall that, in steady state, a spool in the pressure control valve reaches an equilibrium position at which the force from a solenoid is balanced by a hydraulic force generated by the controlled pressure. The size of a restriction between line pressure circuit 20 and controlled pressure circuit 26 varies based on the position of the spool. At the equilibrium position, the restriction establishes the necessary pressure drop such that the forces balance. The required restriction size, and therefore the required spool position, depends upon the flow rate through the restriction which, in turn, depends upon the flow rate in the controlled pressure circuit. When the solenoid force is suddenly reduced, the spool accelerates in the direction which decreases the size of the restriction to lower the commanded pressure. However, the spool inertia may carry it past the new equilibrium point. Consequently, pressure in the controlled pressure circuit 26 may drop below the commanded value and then fluctuate around the commanded value until the spool settles into the new equilibrium position.

The dynamic behavior of latch valve 28 may exacerbate the tendency to undershoot the commanded pressure. As the spool of the latch valve moves toward the de-latched position, the volume of chamber 98 decreases. This reduces the flow rate in controlled pressure circuit 26. At the lower flow rate, the spool of pressure control valve 24 seeks a position at which the restriction is very small. Then, when chamber 98 opens up to port 76, fluid begins to flow into clutch apply circuit 30 increasing the flow rate through controlled pressure circuit 26. The increased flow rate through the very small restriction produces a large pressure drop and a low commanded pressure temporarily. Even a temporary undershoot may permit the clutch to slip briefly producing an annoying torque disturbance. To avoid undershoot, the control pressure may be commanded to an intermediate value during the transition and then dropped to the target value after the spool has moved to the de-latched position.

Figure 6:
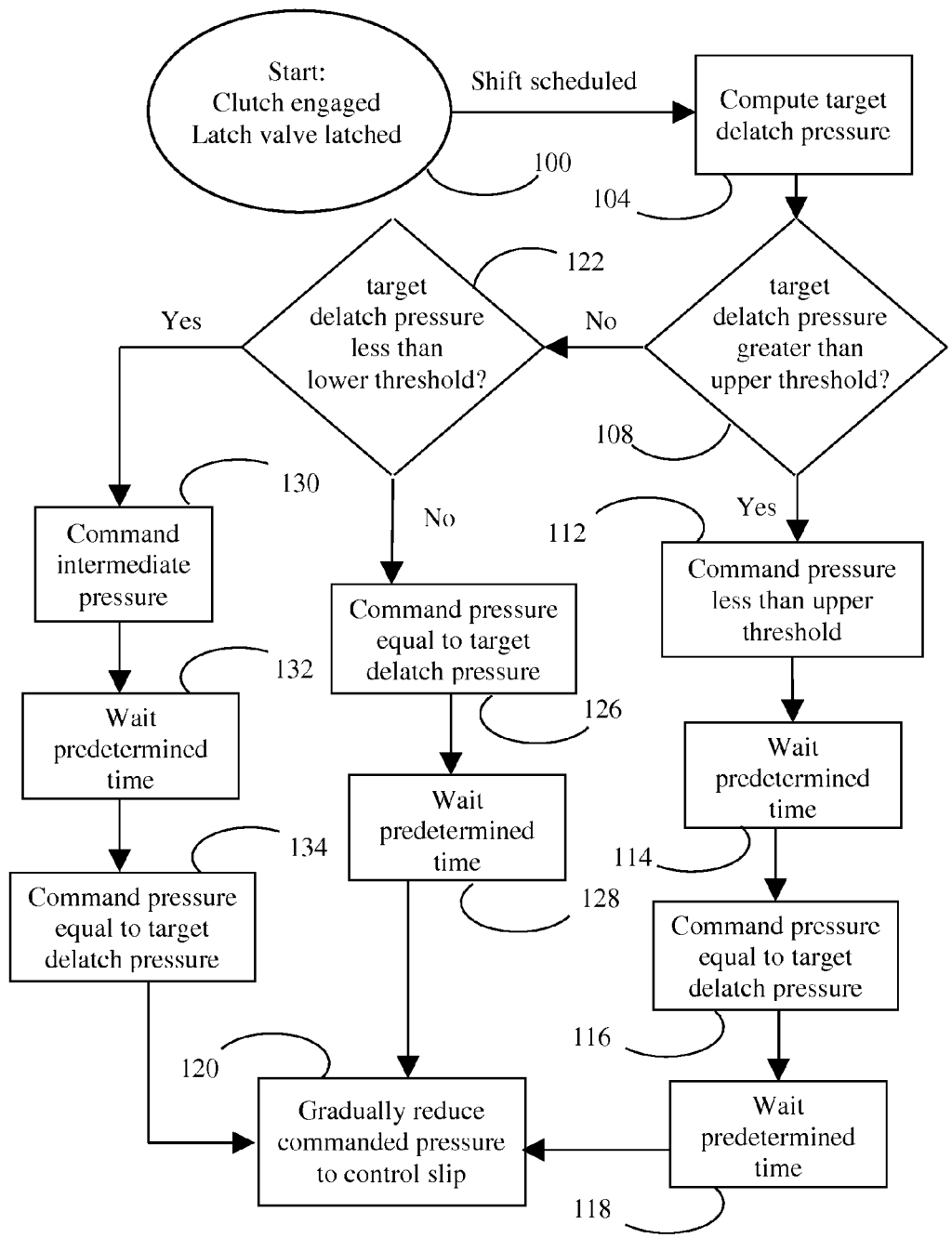
FIG. 6 is a flow chart illustrating a method of controlling a transition of a latch valve from the latched position of FIG. 4 to the de-latched position of FIG. 3 at a variety of transmission input torque levels.
Figure 7:
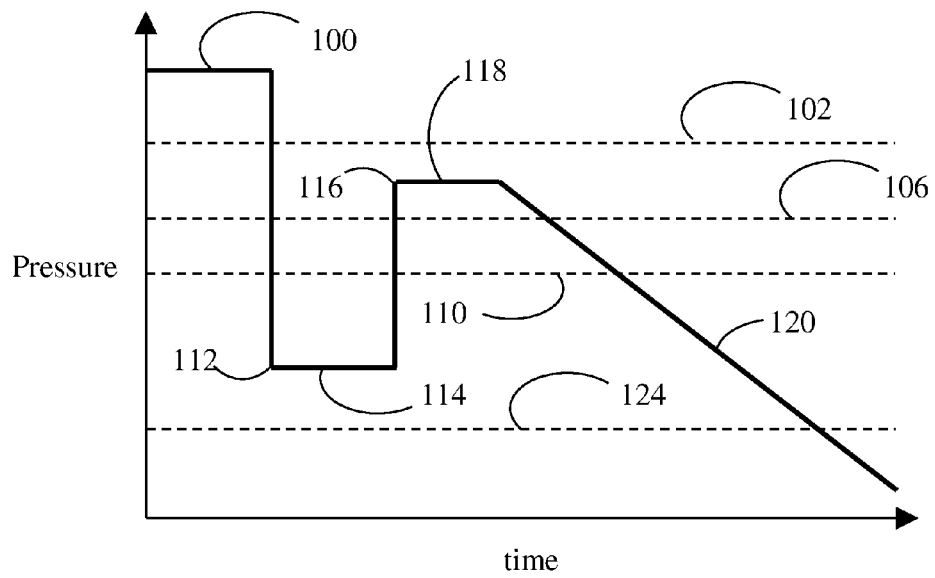
FIG. 7 is a graph illustrating a transition using the method of FIG. 6 at a relatively high transmission input torque.
Figure 8:
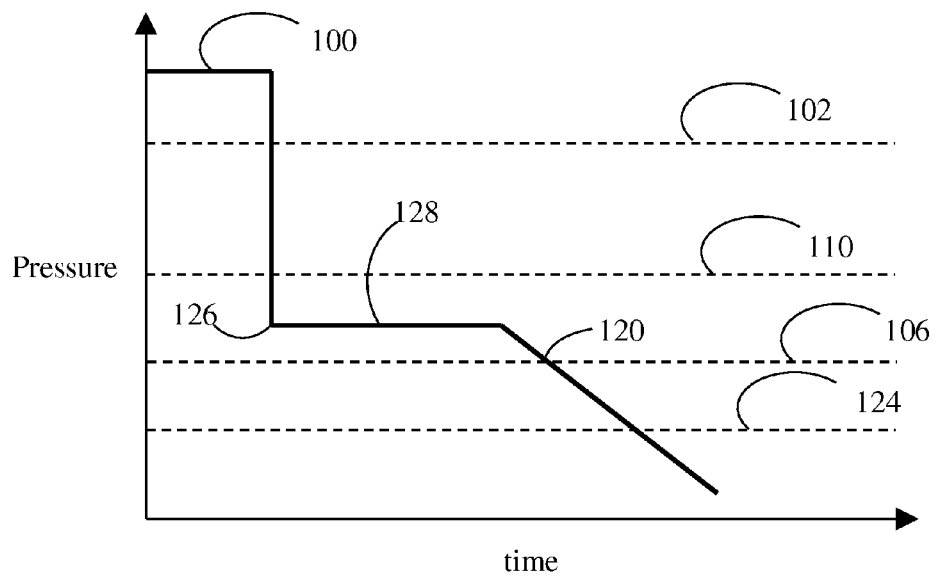
FIG. 8 is a graph illustrating a transition using the method of FIG. 6 at a moderate transmission input torque.
Figure 9:
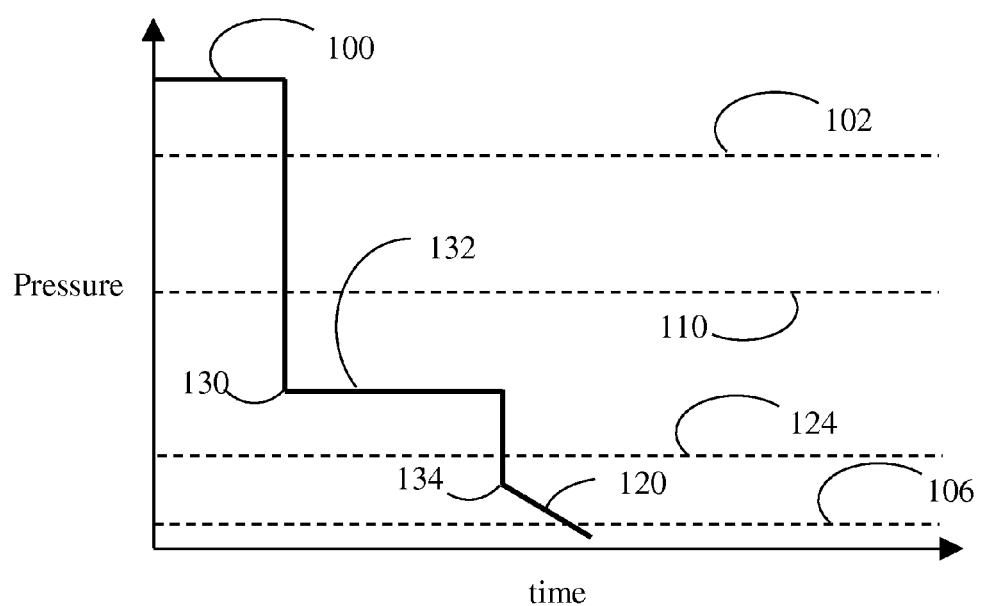
FIG. 9 is a graph illustrating a transition using the method of FIG. 6 at a relatively low transmission input torque.

FIG. 6 is a flow chart illustrating a method of controlling a de-latch transition such that a transmission clutch can be released in a controlled manner during a transmission shift. FIGS. 7, 8, and 9 illustrates a de-latch events according to the method of FIG. 6 at high, moderate, and low transmission input torque, respectively. In initial state 100, the clutch is engaged and the latch valve is in the latch position. As shown in FIGS. 7-9, the commanded control pressure is maintained at a pressure higher than latch pressure 102 of the latch valve. When a shift is scheduled that required release of the clutch, a target pressure is computed at 104 based on the transmission input torque and the gear state. The transmission input torque and gear state determine the pressure at which the clutch would begin to slip 106. The target pressure is selected to provide enough margin above the slip pressure to avoid slip but small enough margin to prepare for rapid transition to controlled slip.

At 108, the target pressure is compared to an upper threshold pressure 110. If the target pressure is higher than the threshold, the controller uses the accelerated de-latch procedure illustrated in FIG. 7. At 112, the control pressure is commanded to a value less than the upper threshold 110 and also less than the pressure required to avoid clutch slip 106. Since the control pressure is substantially less than the latch pressure, the spool accelerates rapidly toward the de-latched position. At 114, the control pressure is held for a predetermined amount of time. The amount of time is calibrated such that the spool has time to accelerate to a sufficient speed to carry it past the neutral position but does not yet reach the de-latched position. This time period may be between 20 ms and 100 ms. At 116, the control pressure is commanded to the target pressure. At 118, the controller waits long enough for the spool to reach the de-latch position. Finally, at 120, the control pressure is gradually reduced. Once the clutch begins to slip, the control pressure may be controlled in closed loop to establish a desired amount of clutch slip. As the oncoming clutch torque capacity increases, progressively less control pressure to the off-going clutch is required to maintain the desired amount of slip.

If the target pressure is less than the upper threshold 106, then the target pressure is compared to a lower threshold 124 at 122. If the target pressure is less than the lower threshold, the controller uses the direct de-latch procedure illustrated in FIG. 8. At 126, the control pressure is commanded, in a single step, to the target pressure. At 128, the controller waits long enough for the spool to reach the de-latch position. Finally, at 120, the control pressure is gradually reduced to release the clutch as described above.

If the target pressure is less than the lower threshold, then the controller uses the undershoot avoidance procedure illustrated in FIG. 9. At 130, the control pressure is commanded to an intermediate value. At 132, the control pressure is held for a predetermined amount of time sufficient for the spool to reach the de-latch position. At 134, the control pressure is reduced further to the target pressure. Finally, at 120, the control pressure is gradually reduced to release the clutch as described above.

While exemplary embodiments are described above, it is not intended that these embodiments describe all possible forms encompassed by the claims. For example, although certain parameters are described as calibratable constants, adaptive methods to dynamically adjust these parameters during operation are possible. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of controlling a latch valve transition from a latched state to a de-latched state, the method comprising:
   in the latched state, commanding a first pressure value greater than a latch pressure value such that a line pressure is supplied to a hydraulically actuated transmission clutch; and
   in response to a target pressure value being greater than an upper threshold, commanding a second pressure value less than the upper threshold to accelerate movement of a latch spool, and
       while the latch spool is moving toward a de-latched position, increasing the commanded pressure from the second pressure value to the target pressure value.

2. The method of claim 1 wherein the commanded pressure is maintained at the second pressure for a predetermined time between 20 ms and 100 ms.

3. The method of claim 1 further comprising, in response to the target pressure value being less than a lower threshold,
   commanding a third pressure value between the lower threshold and the upper threshold to move the spool to the de-latched position without undershooting the target pressure; and
   after the de-latched state has been established, reducing the commanded pressure to the target pressure value.

4. The method of claim 3 further comprising, in response to the target pressure value being between the lower threshold and the upper threshold, reducing the commanded pressure in a single step from the first pressure value to the target pressure value.

5. The method of claim 1 wherein the target pressure is based on a transmission input torque value and a transmission gear state such that supplying the target pressure to the transmission clutch will prevent clutch slip.

6. The method of claim 5 further comprising gradually reducing the commanded pressure to initiate controlled clutch slip.

7. A method of controlling a transmission clutch via a latch valve comprising:
   at a first transmission input torque, reducing a control pressure to a value less than a clutch pressure required to prevent clutch slip at the first transmission input torque to initiate a first de-latch event; and
   while a latch spool is moving to a de-latched position during the first de-latch event, increasing the control pressure to a first value to prevent clutch slip.

8. The method of claim 7 further comprising:
   at a second transmission input torque less than the first transmission input torque, monotonically reducing the control pressure to a second value less than the first value and greater than a clutch pressure required to prevent clutch slip at the second transmission input torque to initiate a second de-latch event.

9. The method of claim 8 wherein the second de-latch is initiated by reducing the control pressure directly to the second value in a single step.

10. The method of claim 8 further comprising:
    at a third transmission input torque less than the second transmission input torque, reducing the control pressure to an intermediate value until the latch spool reaches the de-latch position and then reducing the control pressure to a third value less than the second value and greater than a clutch pressure required to prevent clutch slip at the third transmission input torque.

11. A transmission comprising:
a clutch having an apply chamber;
a latch valve having
- a bore defining an outlet port in fluid communication with the apply chamber,
- a line pressure port, and a control pressure port and
- a spool configured to slide within the bore between a latched position and a de-latched position; and a controller programmed to
- at a first transmission input torque, reduce a pressure at the control pressure port to a value less than a clutch apply pressure required to prevent clutch slip at the first transmission input torque to initiate a first de-latch event; and
- while the spool is moving to the de-latched position during the first de-latch event, increase the control pressure to a first value to prevent clutch slip.

12. The transmission of claim 11 wherein
the outlet port is between the line pressure port and the control pressure port and is separated from the line pressure port and control pressure port by bore lands; and
the spool includes first, second, and third spool lands positioned such that the line pressure port is between the first spool land and the second spool land and the control pressure port is between the second spool land and the third spool land.

13. The transmission of claim 12 wherein the third spool land has a diameter greater than a diameter of the second spool land such that pressure between the second land and the third land biases the spool toward the latched position.

14. The transmission of claim 13 further comprising a spring biasing the spool toward the de-latched position.

15. The transmission of claim 11 wherein the controller is further programmed to, at a second transmission input torque, monotonically reduce the control pressure to a second value less than the first value and greater than a clutch pressure required to prevent clutch slip at the second transmission input torque to initiate a second de-latch event.

16. The transmission of claim 15 wherein the second de-latch is initiated by reducing the control pressure directly to the second value in a single step.

17. The transmission of claim 15 wherein the controller is further programmed to, at a third transmission input torque less than the second transmission input torque, reduce the control pressure to an intermediate value until the spool reaches the de-latch position and then reduce the control pressure to a third value less than the second value and greater than a clutch pressure required to prevent clutch slip at the third transmission input torque.

* * * * *